(12) United States Patent
Jung et al.

(10) Patent No.: US 11,317,429 B2
(45) Date of Patent: Apr. 26, 2022

(54) METHOD FOR TRANSMITTING AND RECEIVING SCHEDULING INFORMATION IN COMMUNICATION SYSTEM

(71) Applicant: ELECTRONICS AND TELECOMMUNICATIONS RESEARCH INSTITUTE, Daejeon (KR)

(72) Inventors: Hoi Yoon Jung, Daejeon (KR); Sung Ik Park, Daejeon (KR); Heung Mook Kim, Daejeon (KR); Nam Ho Hur, Sejong (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 80 days.

(21) Appl. No.: 16/636,460

(22) PCT Filed: Jul. 5, 2018

(86) PCT No.: PCT/KR2018/007664
§ 371 (c)(1),
(2) Date: Feb. 4, 2020

(87) PCT Pub. No.: WO2019/035555
PCT Pub. Date: Feb. 21, 2019

(65) Prior Publication Data
US 2020/0196339 A1    Jun. 18, 2020

(30) Foreign Application Priority Data

Aug. 14, 2017 (KR) .......................... 10-2017-0102823
Feb. 19, 2018 (KR) .......................... 10-2018-0019167

(51) Int. Cl.
*H04W 72/12* (2009.01)
*H04W 72/04* (2009.01)
*H04W 72/10* (2009.01)

(52) U.S. Cl.
CPC ... *H04W 72/1278* (2013.01); *H04W 72/0446* (2013.01); *H04W 72/10* (2013.01)

(58) Field of Classification Search
CPC ......... H04W 72/1278; H04W 72/0446; H04W 72/10; H04W 72/1273; H04W 72/1289; H04L 1/00; H04L 5/00; H04L 27/26
See application file for complete search history.

(56) References Cited

U.S. PATENT DOCUMENTS 7,894,391 B2   2/2011  Kwon et al.
9,609,637 B2   3/2017  Hammarwall et al.
(Continued)

FOREIGN PATENT DOCUMENTS

WO   2004/068808 A1   8/2004
WO   2008/021787 A1   2/2008
(Continued)

OTHER PUBLICATIONS

CATT Further design considerations for DL pre-emption indication 3gPP TSG RAN WG1 NR ad-Hoc#2 R1-1710101 Jun. 2017 (Year: 2017).*
(Continued)

*Primary Examiner* — Rina C Pancholi
(74) *Attorney, Agent, or Firm* — Rabin & Berdo, P.C.

(57) ABSTRACT

A method for transmitting and receiving scheduling information in a communication system is disclosed. A method for operating a UE comprises the steps of: receiving, from a base station, a control channel including scheduling information of first data in slot #n; receiving, from the base station, a data channel including the first data and second data in the slot #n; receiving, from the base station, a control channel in slot #n+k, the control channel including PI indicating a transmission position of the second data in the slot #n; and demodulating the data channel on the basis of
(Continued)

the scheduling information and the PI. Therefore, the performance of a communication system can be improved.

17 Claims, 12 Drawing Sheets

(56) References Cited

U.S. PATENT DOCUMENTS

| | | |
|---|---|---|
| 2015/0016376 A1 | 1/2015 | Seo |
| 2016/0197717 A1* | 7/2016 | Zhang .................. H04B 7/2656 370/337 |
| 2016/0374094 A1 | 12/2016 | Bakshe et al. |
| 2017/0142712 A1 | 5/2017 | Lee et al. |
| 2017/0171841 A1 | 6/2017 | Chen et al. |
| 2017/0215188 A1 | 7/2017 | Kim et al. |
| 2018/0063865 A1* | 3/2018 | Islam ................... H04L 5/0064 |

FOREIGN PATENT DOCUMENTS

| | | | |
|---|---|---|---|
| WO | 2008/024321 A2 | 2/2008 | |
| WO | WO-2018093162 A1 * | 5/2018 | ............ H04W 72/04 |

OTHER PUBLICATIONS

CATT, "Further Design Considerations for DL Pre-emption Indication", R1-1710101, 3GPP TSG RAN WG1 NR Ad-Hoc #2, Qingdao, P. R. China, Jun. 17, 2017.

KT Corp., "Views on Preemption Indication for DL", R1-1711474, 3GPP TSG RAN WG1 NR Ad-Hoc#2, Qingdao, P. R. China, Jun. 16, 2017.

Sharp, "Pardon the Interruption: Downlink Control Signaling to Enable Preemption and CBG-based (Re) Transmission", R1-1711245, 3GPP TSG RAN WG1 NR#2 AH Meeting, Qingdao, P. R. China, Jun. 17, 2017.

* cited by examiner

METHOD FOR TRANSMITTING AND RECEIVING SCHEDULING INFORMATION IN COMMUNICATION SYSTEM

TECHNICAL FIELD

The present invention relates to a technique for transmitting and receiving scheduling information, and more particularly, to a method for configuring scheduling information, a method for transmitting and receiving scheduling information, and a method for obtaining scheduling information in a communication system.

BACKGROUND ART

With the development of information and communication technology, various wireless communication technologies are being developed. Typical wireless communication technologies include long term evolution (LTE), new radio (NR), or the like defined as the 3rd generation partnership project (3GPP) standard. The LTE may be one of 4th generation (4G) wireless communication technologies, and the NR may be one of 5th generation (5G) wireless communication technologies.

A 5G communication system (e.g., communication system supporting the NR) using a frequency band (e.g., frequency band above 6 GHz) higher than a frequency band (e.g., frequency band below 6 GHz) of a 4G communication system (e.g., communication system supporting the LTE) as well as the frequency band of the 4G communication system has been considered for processing of wireless data which has rapidly increased since commercialization of the 4G communication system. The 5G communication system can support Enhanced Mobile Broadband (eMBB), Ultra-Reliable and Low-Latency Communication (URLLC), and massive Machine Type Communication (mMTC).

In order to support the services (e.g., eMBB, URLLC, mMTC, etc.) described above in the 5G communication system, a plurality of services need to be provided simultaneously in one frame. For example, when URLLC data (e.g., data transmitted according to requirements of URLLC) occurs urgently, scheduling of data may be changed dynamically to meet the requirements of URLLC. Accordingly, data (e.g., eMBB data and URLLC data) according to different services may exist in one data channel, and a method for transmitting and receiving scheduling information for the data according to different services is needed.

Meanwhile, the technology as the background of the invention is intended to enhance understanding of the background of the invention, and may include contents that are not known to the person of ordinary skill in the art.

DISCLOSURE

Technical Problem

The objective of the present invention to solve the above-described problem is to provide a method for transmitting and receiving scheduling information in a communication system.

Technical Solution

An operation method of a base station, according to a first embodiment of the present invention for achieving the above-described objective, may comprise transmitting to a user equipment (UE) a control channel including scheduling information for first data in a slot #n; transmitting to the UE a data channel including the first data and second data in the slot #n; and transmitting to the UE a control channel including a preemption indication (PI) indicating a transmission position of the second data within the slot #n in a slot #n+k, wherein n is an integer equal to or greater than 0 and k is an integer equal to or greater than 1.

Here, the operation method may further comprise, before the transmitting a control channel including scheduling information for first data, transmitting an upper layer message including configuration information of a detection operation of the PI to the UE.

Here, the configuration information may include information indicating whether to perform the detection operation of the PI and information indicating an execution period of the detection operation of the PI.

Here, the first data and the second data may be transmitted in the slot #n based on a rate matching scheme or a puncturing scheme.

Here, a transmission priority of the first data may be lower than a transmission priority of the second data.

Here, the transmission position of the second data indicated by the PI may be represented as a bitmap or an offset from a reference position.

Here, the control channel including the PI may be a group control channel that UEs located in a cell of the base station are able to receive.

An operation method of a UE, according to a second embodiment of the present invention for achieving the above-described objective, may comprise receiving from a base station a control channel including scheduling information for first data in a slot #n; receiving from the base station a data channel including the first data and second data in the slot #n; and receiving from the base station a control channel including a preemption indication (PI) indicating a transmission position of the second data within the slot #n in a slot #n+k, wherein n is an integer equal to or greater than 0 and k is an integer equal to or greater than 1.

Here, the operation method may further comprise, before the receiving a control channel including scheduling information for first data, receiving an upper layer message including configuration information of a detection operation of the PI from the base station.

Here, the configuration information may include information indicating whether to perform the detection operation of the PI and information indicating an execution period of the detection operation of the PI.

Here, when the execution period of the detection operation of the PI indicated by the configuration information is k slots, the control channel including the PI may be received in the slot #n+k.

Here, the first data may be obtained in the slot #n based on a rate matching scheme or a puncturing scheme.

Here, a transmission priority of the first data may be lower than a transmission priority of the second data.

Here, the transmission position of the second data indicated by the PI may be represented as a bitmap or an offset from a reference position.

Here, the control channel including the PI may be a group control channel that UEs located in a cell of the base station are able to receive.

A UE according to a third embodiment of the present invention for achieving the above-described objective may comprise a processor and a memory storing at least one instruction executed by the processor, wherein the at least one instruction is configured to receive from a base station a control channel including scheduling information for first data in a slot #n; receive from the base station a data channel including the first data and second data in the slot #n; and receive from the base station a control channel including a preemption indication (PI) indicating a transmission position of the second data within the slot #n in a slot #n+k, wherein n is an integer equal to or greater than 0 and k is an integer equal to or greater than 1.

Here, the at least one instruction may be further configured to, before the receiving of the control channel including the scheduling information for the first data, receive an upper layer message including configuration information of a detection operation of the PI from the base station.

Here, the configuration information may include information indicating whether to perform the detection operation of the PI and information indicating an execution period of the detection operation of the PI.

Here, the first data may be obtained in the slot #n based on a rate matching scheme or a puncturing scheme.

Here, the transmission position of the second data indicated by the PI may be represented as a bitmap or an offset from a reference position.

Advantageous Effects

According to the present invention, when scheduling information for first data, the first data, and second data are transmitted in a slot #n, information indicating a transmission position of the second data in the slot #n can be transmitted in a slot #n+k. In this case, a user equipment (UE) can demodulate the first data in the slot #n by using the scheduling information of the first data and the information indicating the transmission position of the second data. Therefore, a signal demodulation performance of the UE can be improved, and the performance of the communication system can be improved.

MODES OF THE INVENTION

Figure 1:
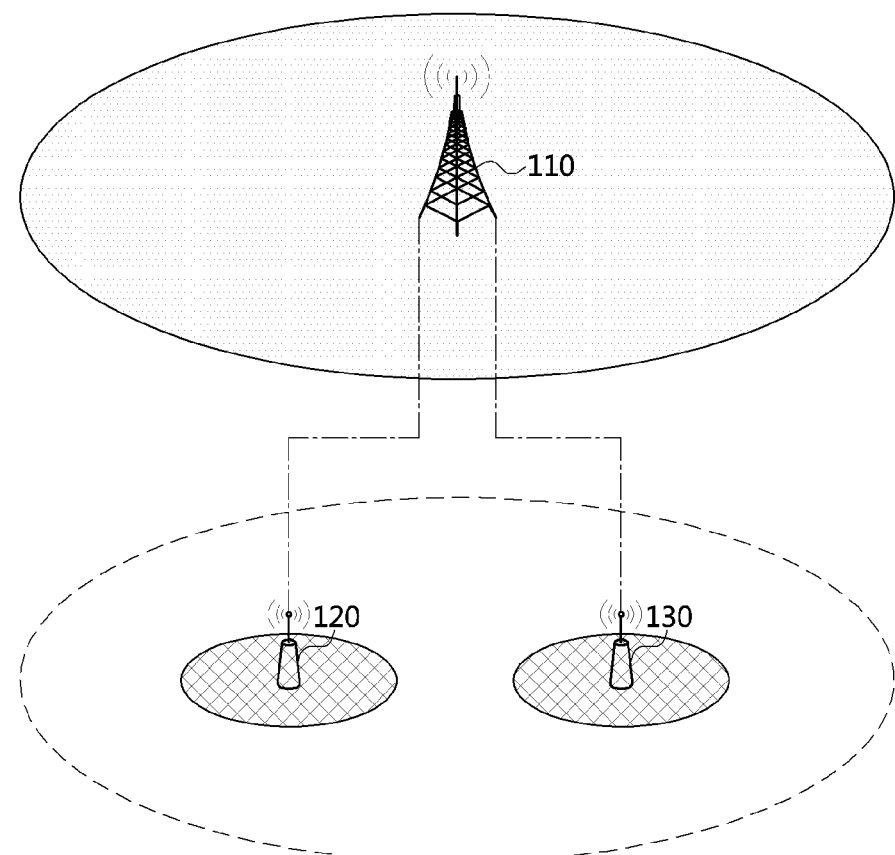
FIG. 1 is a conceptual diagram illustrating a first embodiment of a wireless communication system.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, exemplary embodiments of the present invention will be described in greater detail with reference to the accompanying drawings. To facilitate overall understanding of the present invention, like numbers refer to like elements throughout the description of the drawings, and description of the same component will not be reiterated.

A wireless communication network to which embodiments according to the present invention are applied will be described. The wireless communication network to which the embodiments according to the present invention are applied is not limited to the following description, and the embodiments according to the present invention can be applied to various wireless communication networks. Here, the wireless communication network may be used in the same sense as a wireless communication system.

FIG. 1 is a conceptual diagram illustrating a first embodiment of a wireless communication network.

Referring to FIG. 1, a first base station 110 may support a cellular communication (e.g., long term evolution (LTE), LTE-advance (LTE-A), new radio (NR), etc. specified in the $3^{rd}$ generation partnership project (3GPP)), or the like. The first base station 110 may support multiple input multiple output (MIMO) (e.g., single-user MIMO (SU-MIMO), multi-user MIMO (MU-MIMO), massive MIMO, etc.), coordinated multipoint (CoMP), carrier aggregation (CA), or the like.

The first base station 110 may operate in a frequency band F1 and may form a macro cell. The first base station 110 may be connected to another base station (e.g., second base station 120, third base station 130, etc.) through an ideal backhaul or a non-ideal backhaul. The second base station 120 may be located within the coverage of the first base station 110. The second base station 120 may operate in a frequency band F2 and may form a small cell. The communication scheme (e.g., NR) supported by the second base station 120 may be different from the communication scheme of the first base station 110 (e.g., LTE).

The third base station 130 may be located within the coverage of the first base station 110. The third base station 130 may operate in the frequency band F2 and may form a small cell. The communication scheme (e.g., NR) supported by the third base station 120 may be different from the communication scheme of the first base station 110 (e.g., LTE). Each of the first base station 110 and a user equipment (UE) (not shown) connected to the first base station 110 may transmit and receive signals through a carrier aggregation (CA) between the frequency band F1 and the frequency band F2. Alternatively, each of the UE connected to the first base station 110 and the first base station 110 may support dual-connectivity (DC) for the frequency band F1 and the frequency band F2, and may transmit and receive signals in the DC environment.

The communication node (i.e., base station, UE, etc.) constituting the wireless communication network described above may supporting a code division multiple access (CDMA) based communication protocol, a wideband CDMA (WCDMA) based communication protocol, a time division multiple access (TDMA) based communication protocol, a frequency division multiple access (FDMA) based communication protocol, a single carrier-FDMA (SC-FDMA) based communication protocol, an orthogonal frequency division multiplexing (OFDM) based communication protocol, an orthogonal frequency division multiple access (OFDMA) based communication protocol, or the like.

Among the communication nodes, the base station may be referred to as a Node B, an evolved Node B, a 5G Node B (gNodeB), a base transceiver station (BTS), a radio base station, a radio transceiver, an access point, an access node, a transmission/reception point (Tx/Rx Point), or the like. Among the communication nodes, the UE may be referred to as a terminal, an access terminal, a mobile terminal, a station, a subscriber station, a portable subscriber station, a mobile station, a node, a device, or the like. The communication node may have the following structure.

Figure 2:
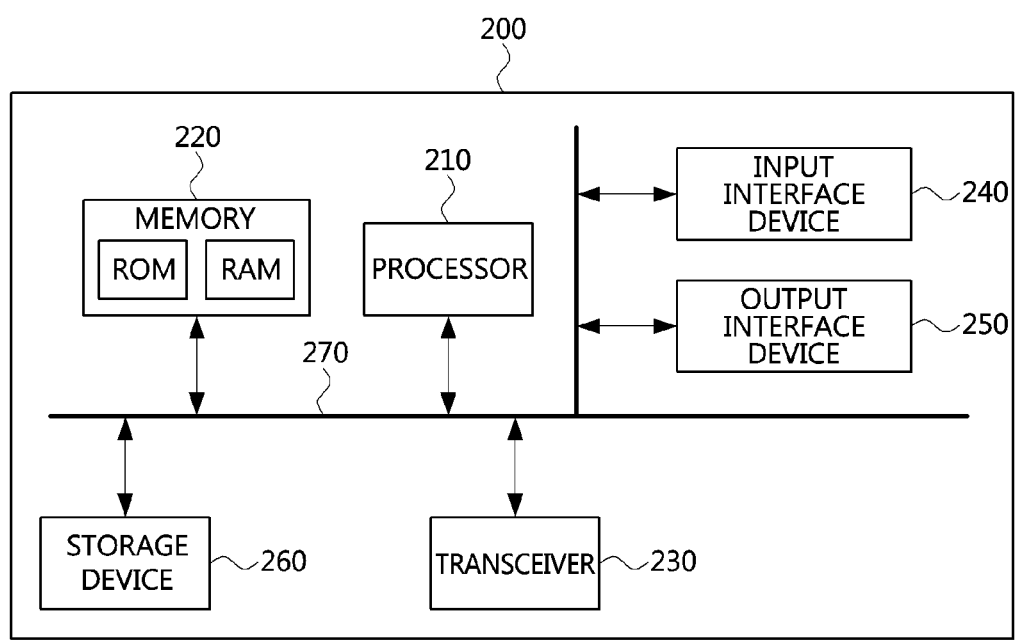
FIG. 2 is a block diagram illustrating a first embodiment of a communication node constituting a wireless communication network.

FIG. 2 is a block diagram illustrating a first embodiment of a communication node constituting a wireless communication network.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may not be connected to the common bus 270 but may be connected to the processor 210 via an individual interface or a separate bus. For example, the processor 210 may be connected to at least one of the memory 220, the transceiver 230, the input interface device 240, the output interface device 250 and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Next, operation methods of a communication node in a wireless communication network will be described. Even when a method (e.g., transmission or reception of a signal) to be performed at a first communication node among communication nodes is described, a corresponding second communication node may perform a method (e.g., reception or transmission of the signal) corresponding to the method performed at the first communication node. That is, when an operation of a UE is described, a corresponding base station may perform an operation corresponding to the operation of the UE. Conversely, when an operation of the base station is described, the corresponding UE may perform an operation corresponding to the operation of the base station.

Figure 3:
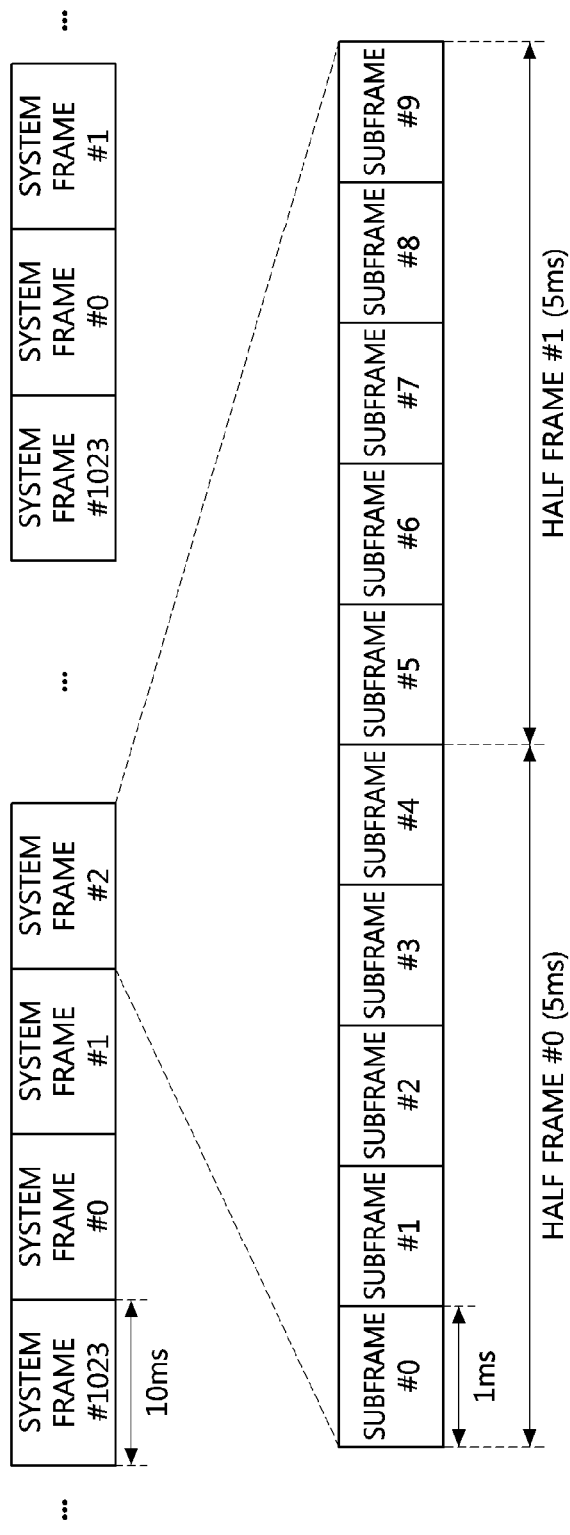
FIG. 3 is a conceptual diagram illustrating a first embodiment of a system frame configuration in a wireless communication network.

FIG. 3 is a conceptual diagram illustrating a first embodiment of a system frame configuration in a wireless communication network.

Referring to FIG. 3, time resources in a wireless communication network may be divided into frames. For example, system frames each of which has a length of 10 milliseconds (ms) may be configured consecutively in the time axis of the wireless communication network. System frame numbers (SFNs) may set to #0 to #1023. In this case, 1024 system frames may be repeated in the time axis of the wireless communication network. For example, an SFN of a system frame after the system frame #1023 may be set to #0. One system frame may comprise two half frames, and the length of one half frame may be 5 ms. A half frame located in a starting region of a system frame may be referred to as a 'half frame #0', and a half frame located in an ending region of the system frame may be referred to as a 'half frame #1'. The system frame may include 10 subframes, and the length of one subframe may be 1 ms. 10 subframes within one system frame may be referred to as 'subframes #0 to #9'.

Figure 4:
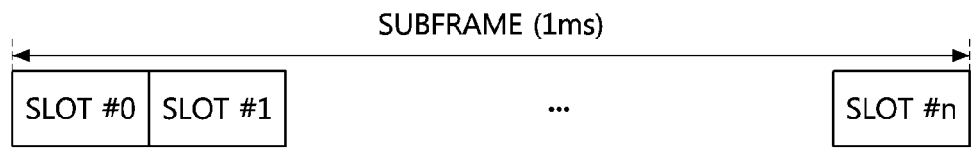
FIG. 4 is a conceptual diagram illustrating a first embodiment of a subframe configuration in a wireless communication network.

FIG. 4 is a conceptual diagram illustrating a first embodiment of a subframe configuration in a wireless communication network.

Referring to FIG. 4, one subframe may include n slots, and n may be an integer of 1 or more. Accordingly, one subframe may be composed of one or more slots.

Figure 5:
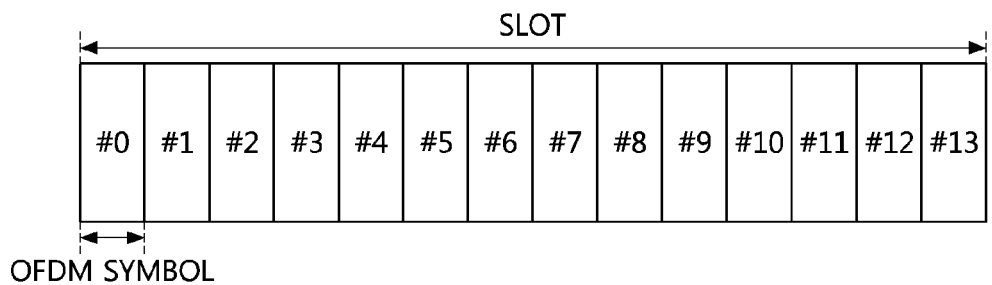
FIG. 5 is a conceptual diagram illustrating a first embodiment of a slot configuration in a wireless communication network.

FIG. 5 is a conceptual diagram illustrating a first embodiment of a slot configuration in a wireless communication network.

Referring to FIG. 5, one slot may comprise one or more OFDM symbols. For example, one slot may be composed of 14 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 6:
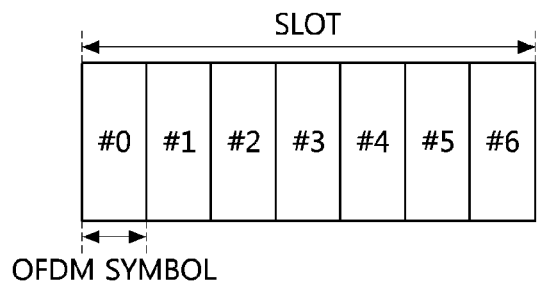
FIG. 6 is a conceptual diagram illustrating a second embodiment of a slot configuration in a wireless communication network.

FIG. 6 is a conceptual diagram illustrating a second embodiment of a slot configuration in a wireless communication network.

Referring to FIG. 6, one slot may comprise 7 OFDM symbols. Here, the length of the slot may vary depending on the number of OFDM symbols included in the slot and the length of the OFDM symbol. The OFDM symbol may be configured as a downlink symbol, an unknown symbol, or an uplink symbol.

Figure 7:
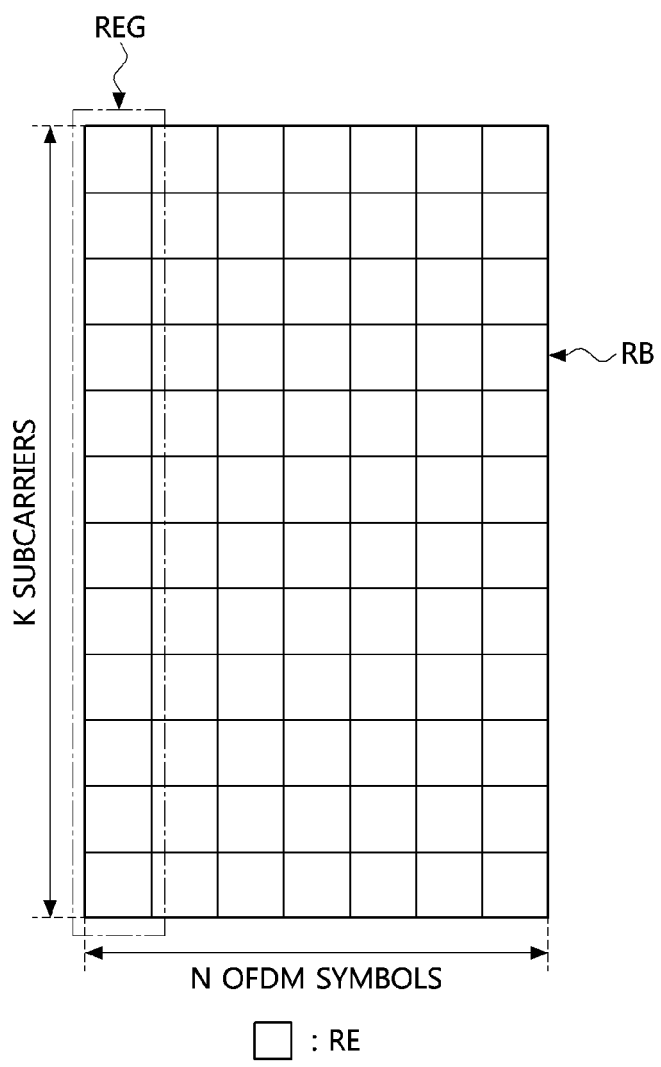
FIG. 7 is a conceptual diagram illustrating a first embodiment of time-frequency resources in a wireless communication network.

FIG. 7 is a conceptual diagram illustrating a first embodiment of time-frequency resources in a wireless communication network.

Referring to FIG. 7, a resource configured with one OFDM symbol in the time axis and one subcarrier in the frequency axis may be defined as a 'resource element (RE)'. Resources configured with one OFDM symbol in the time axis and K subcarriers in the frequency axis may be defined as a 'resource element group (REG)'. One REG may include K REs. Here, K may be 12. Resources configured with N OFDM symbols in the time axis and K subcarriers in the frequency axis may be defined as a 'resource block (RB)'. Here, N may be 6, 7, or 14. The RB may be used as a basic unit of data resource allocation.

Figure 8:
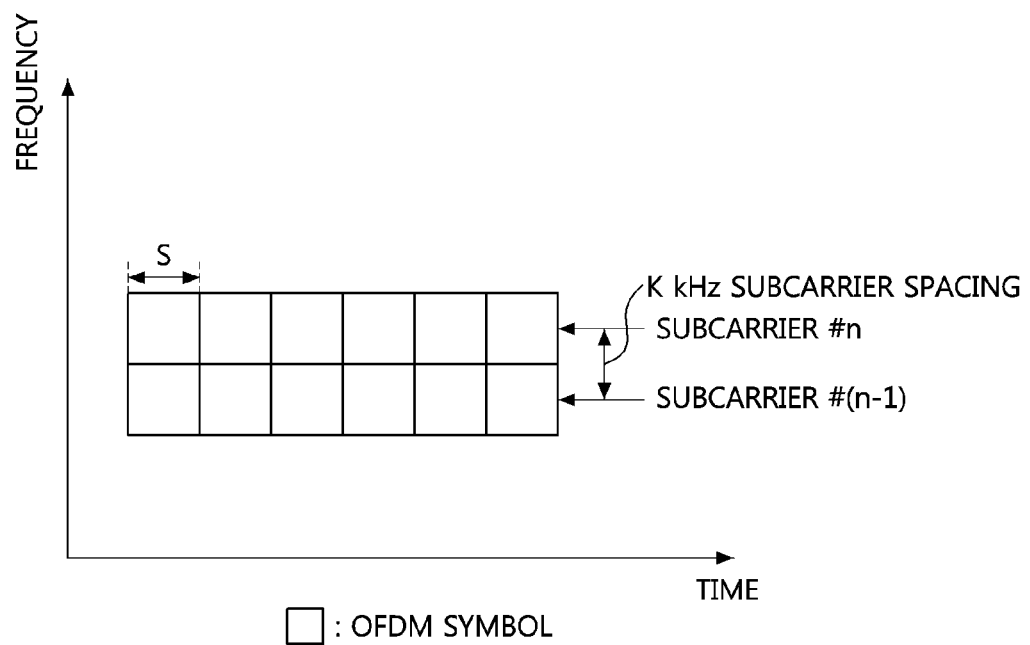
FIG. 8 is a conceptual diagram illustrating a first embodiment of time-frequency resources according to a subcarrier spacing in a wireless communication network.
Figure 9:
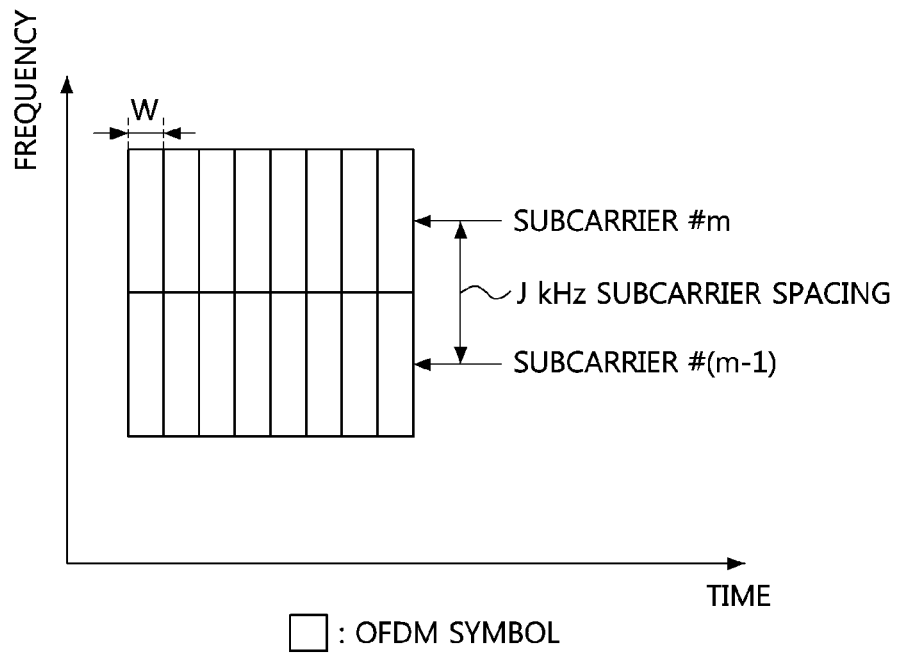
FIG. 9 is a conceptual diagram illustrating a second embodiment of time-frequency resources according to a subcarrier spacing in a wireless communication network.

FIG. 8 is a conceptual diagram illustrating a first embodiment of time-frequency resources according to a subcarrier spacing in a wireless communication network, and FIG. 9 is a conceptual diagram illustrating a second embodiment of time-frequency resources according to a subcarrier spacing in a wireless communication network.

Referring to FIG. 8, in a wireless communication network in which a K kHz subcarrier spacing is used, the length of one OFDM symbol may be S ms. Referring to FIG. 9, in a wireless communication network in which a J kHz subcarrier spacing is used, the length of one OFDM symbol may be W ms. When the subcarrier spacing J kHz is twice the subcarrier spacing K kHz (i.e., J=2K), the length of the OFDM symbol (i.e., W ms) in FIG. 9 may be half the length of the OFDM symbol (i.e., S ms) in FIG. 8. In this case, W=S/2.

In the wireless communication network, the subcarrier spacing may be variably configured. For example, in a wireless communication network in which a 15 kHz subcarrier spacing is used, the length of the OFDM symbol may be $1/15000$ second (s). In this case, the length of one slot composed of 7 OFDM symbols shown in FIG. 6 may be $7/15000$ s.

Figure 10:
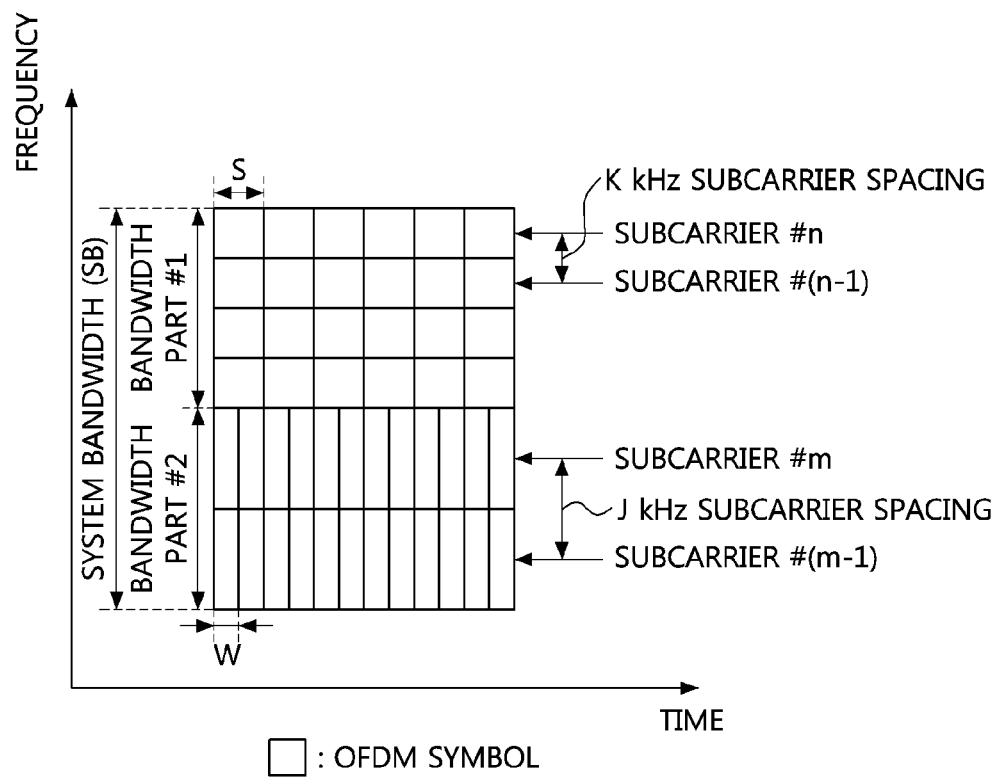
FIG. 10 is a conceptual diagram illustrating a first embodiment of a bandwidth part configuration in a wireless communication network.

FIG. 10 is a conceptual diagram illustrating a first embodiment of a bandwidth part configuration in a wireless communication network.

Referring to FIG. 10, a system bandwidth SB may include one or more bandwidth parts. For example, the system bandwidth SB may include a bandwidth part #1 and a bandwidth part #2. A subcarrier spacing of the bandwidth part #1 may be different from a subcarrier spacing of the bandwidth part #2. The subcarrier spacing of the bandwidth part #1 may be K kHz, in which case the base station and the UE may perform communications based on numerology according to the subcarrier spacing K kHz. The subcarrier spacing of the bandwidth part #2 may be J kHz, in which case the base station and the UE may perform communications based on numerology according to the subcarrier spacing J kHz.

The UE may transmit and receive signals in the entire system bandwidth SB or in some of the system bandwidth (SB) depending on its capability. For example, a UE capable of transmitting and receiving signals in the entire system bandwidth (SB) may be configure to transmit and receive signals in the bandwidth part #1, the bandwidth part #2, or the entire system bandwidth SB (e.g., bandwidth parts #1 and #2). A UE capable of transmitting and receiving signals in some of the system bandwidth SB may be configured to transmit and receive signals in the bandwidth part #1 or the bandwidth part #2.

Figure 11:
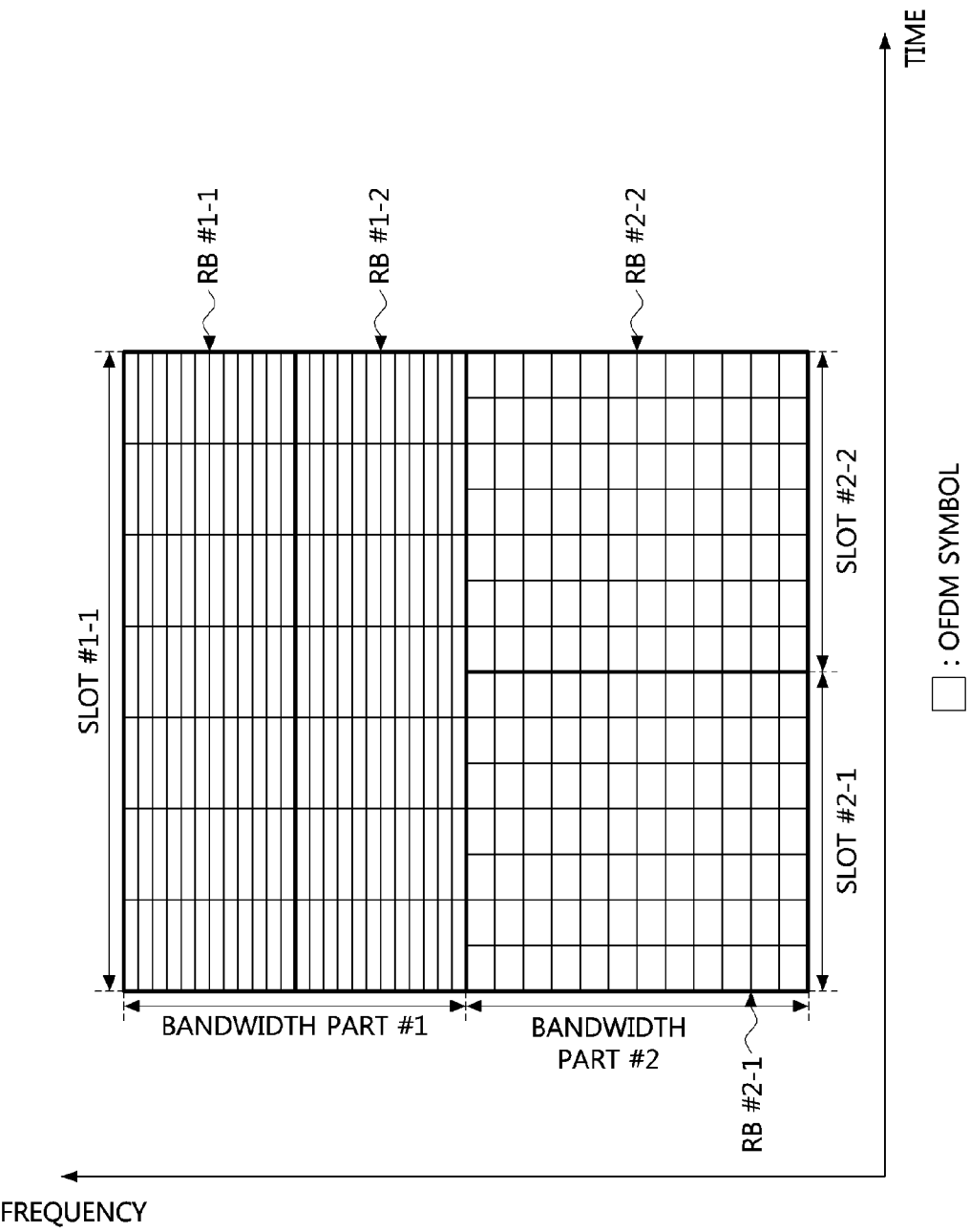
FIG. 11 is a conceptual diagram illustrating a third embodiment of time-frequency resources according to a subcarrier spacing in a wireless communication network.

FIG. 11 is a conceptual diagram illustrating a third embodiment of time-frequency resources according to a subcarrier spacing in a wireless communication network.

Referring to FIG. 11, a subcarrier spacing of a bandwidth part #1 may be different from a subcarrier spacing of a bandwidth part #2. For example, the subcarrier spacing of the bandwidth part #2 may be twice the subcarrier spacing of the bandwidth part #1. The slot may be defined regardless of the subcarrier spacing. For example, one slot may be composed of 7 OFDM symbols regardless of the length of the OFDM symbol. In this case, in the same time period, one slot (e.g., slot #1-1) may be configured in the bandwidth part #1, and two slots (e.g., slot #2-1 and slot #2-2) may be configured in the bandwidth part #2. Also, the RB may be configured with one slot in the time axis and 12 subcarriers in the frequency axis regardless of the subcarrier spacing. In this case, in the same sized time-frequency resources, two RBs (e.g., RB #1-1 and RB #1-2) may be configured in the frequency axis in the bandwidth part #1 and two RBs (e.g., RB #2-1 ad RB #2-2) may be configured in the time axis in the bandwidth part #2.

Figure 12:
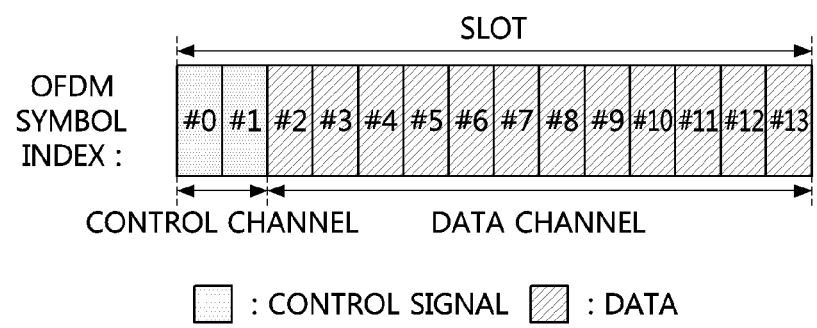
FIG. 12 is a conceptual diagram illustrating a first embodiment of a channel configuration in a slot in a wireless communication network.

FIG. 12 is a conceptual diagram illustrating a first embodiment of a channel configuration in a slot in a wireless communication network.

Referring to FIG. 12, one slot may include 14 OFDM symbols, a control channel may be allocated to OFDM symbols #0 to #1 in the slot, and a data channel may be allocated to OFDM symbols #2 to #13 in the slot. Each of the length of the control channel and the length of the data channel may be changed dynamically. The data channel may be used for transmission of at least one of enhanced Mobile Broadband (eMBB) data, Ultra-Reliable and Low-Latency Communication (URLLC) data, and massive machine type communication (mMTC) data. Here, the eMBB data may indicate data to be transmitted according to the requirements of the eMBB, the URLLC data may indicate data to be transmitted according to the requirements of the URLLC, and the mMTC data may indicate data to be transmitted according to the requirements of the mMTC.

The control channel may include scheduling information (e.g., Downlink control information (DCI)) for a data channel. For example, the scheduling information may include a modulation and coding scheme (MCS) level used for transmission and reception of a data channel, information indicating whether a data channel for a specific UE is allocated, information indicating a time-frequency resource (e.g., a time-frequency resource within the data channel) allocated to a specific UE, and the like. The information indicating the time-frequency resource may include the number of RBs and the number of OFDM symbols allocated to the specific UE.

The base station may transmit the control channel including the scheduling information. The UE may receive the control channel from the base station, obtain the scheduling information from the control channel, and obtain the data channel using the scheduling information. That is, the UE may identify the MCS level indicated by the scheduling information, and obtain the data channel in the time-frequency resource indicated by the scheduling information using the identified MCS level.

Meanwhile, the base station may transmit second data (e.g., URLLC data) instead of first data using some time-frequency resources of a data channel scheduled for transmission and reception of the first data (e.g., eMBB data). In this case, data according to different services (e.g., eMBB, URLLC, mMTC, etc.) may be transmitted in one data channel. The priority of the second data may be higher than the priority of the first data. Methods for transmitting and receiving data according to a plurality of services in one data channel may be as follows.

Figure 13:
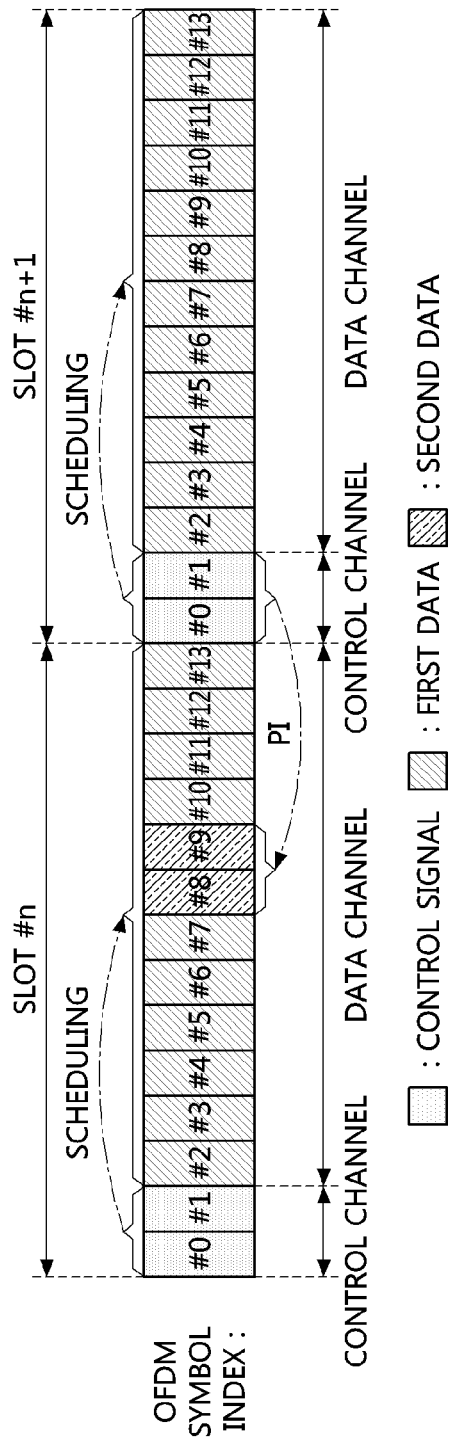
FIG. 13 is a conceptual diagram illustrating a second embodiment of a channel configuration in a slot in a wireless communication network.

FIG. 13 is a conceptual diagram illustrating a second embodiment of a channel configuration in a slot in a wireless communication network.

Referring to FIG. 13, the base station may generate scheduling information (e.g., MCS level, time-frequency resources) for a data channel allocated to OFDM symbols #2 to #13 of a slot #n, and transmit the scheduling information to the UE through OFDM symbols #0 to #1 of the slot #n. Here, the scheduling information may be scheduling information for first data (e.g., eMBB data) transmitted and received through the data channel allocated to the OFDM symbols #2 to #13. n may be an integer of 0 or more.

Meanwhile, transmission of second data (e.g., URLLC data) may be required in the slot #n due to occurrence of a specific event. In this case, the base station may transmit the second data instead of the first data in one or more OFDM symbols (e.g., OFDM symbols #8 to #9) among the OFDM symbols #2 to #13 allocated for the data channel in the slot #n. In the following embodiments, the first data may indicate data scheduled by the control channel (e.g., scheduling information) of the slot #n, and the second data may indicate data that is not scheduled by the control channel (e.g., scheduling information) of the slot #n.

In the data channel of the slot #n, the first data and the second data may be transmitted based on a rate matching scheme. In this case, the first data may be rate-matched to the OFDM symbols #2 to #7 and #10 to #13 of the slot #n, and the second data may be transmitted in the OFDM symbols #8 to #9 of the slot #n. Alternatively, in the data channel of the slot #n, the first data and the second data may be transmitted based on a puncturing scheme. In this case, the first data may be mapped to the OFDM symbols #2 to #13 of the slot #n, the OFDM symbols #8 to #9 of the slot #n to which the first data is mapped may be punctured, and the second data may be transmitted in the punctured OFDM symbols #8 to #9 of the slot #n. Alternatively, in the data channel of the slot #n, the first data and the second data may be transmitted based on an overlapping scheme. In this case, the first data may be mapped to the OFDM symbols #2 to #13 of the slot #n, and the second data may be further mapped to the OFDM symbols #8 to #9 of the slot #n.

However, when scheduling information for the second data is not generated before the transmission of the control channel, the scheduling information for the second data may not be transmitted through the control channel allocated to the OFDM symbols #0 to #1 of the slot #n. That is, only scheduling information for the first data may be transmitted in the control channel allocated to the OFDM symbols #0 to #1 of the slot #n. In this case, although the first data and the second data are transmitted in the data channel of the slot #n, since the scheduling information obtained by the UE in the control channel of the slot #n is the scheduling information for the first data, demodulation performance on the first data and the second data may be degraded in the slot #n.

In order to solve the above-described problem, the base station may inform the UE of whether the second data other than the first data scheduled by the control channel has been transmitted or not in the data channel and a transmission position of the second data. An indicator, which indicates whether the second data other than the first data scheduled by the control channel has been transmitted or not in the data channel and the transmission position of the second data, may be referred to as a preemption indication (PI).

For example, the base station may transmit the PI for the second data transmitted in the OFDM symbols #8 to #9 of the slot #n through a control channel of a slot after the slot #n (e.g., slot #n+k). k may be an integer of 1 or more. In this case, the control channel including the PI may be configured as a group control channel that can be commonly received by UEs in the cell of the base station. In addition, the base station may transmit an upper layer message (e.g., radio resource control (RRC) message) to the UE indicating whether to perform a PI detection operation (e.g., a PI monitoring operation) on the group control channel. In this case, when the upper layer message instructing to perform the PI detection operation on the group control channel is received from the base station, the UE may perform the PI detection operation on the group control channel.

Meanwhile, the UE receiving the slot #n may not recognize that the second data has been transmitted instead of the first data in the OFDM symbols #8 to #9 of the slot #n. However, the UE that has received the slot after the slot #n (e.g., slot #n+k) may obtain the PI from the control channel of the corresponding slot, and may recognize that the second data has been transmitted instead of the first data in the OFDM symbols #8 to #9 of the slot #n based on the PI. Therefore, the UE may perform a decoding operation on the data channel (e.g., the first data and the second data) of the slot #n in consideration of the information indicated by the PI.

For example, when the first data and the second data are transmitted based on the rate matching scheme in the data channel of the slot #n, the UE may obtain the first data by performing a rate matching operation in the remaining OFDM symbols #2 to #7 and #10 to #13 excluding the OFDM symbols #8 to #9 indicated by the PI among the OFDM symbols #2 to #13 constituting the data channel in the slot #n.

Alternatively, when the first data and the second data are transmitted based on the puncturing scheme in the data channel of the slot #n, the UE may obtain the first data by performing a data demodulation operation in the remaining OFDM symbols #2 to #7 and #10 to #13 excluding the OFDM symbols #8 to #9 indicated by the PI among the OFDM symbols #2 to #13 constituting the data channel in the slot #n.

Alternatively, when the first data and the second data are transmitted based on the overlapping scheme in the data channel of the slot #n, the UE may obtain the first data by performing a data demodulation operation in the OFDM symbols #2 to #13 constituting the data channel in the slot #n. However, the UE may assume that the corresponding data (e.g., the data mapped to the OFDM symbols #8 to #9) in the data demodulation operation has low reliability.

Meanwhile, the transmission position of the second data in the time axis may be indicated as follows. The PI may include information (hereinafter referred to as 'preemption time information') indicating the transmission position of the second data in the time axis. The preemption time information may be configured as a bitmap. When the slot #n includes 14 OFDM symbols, the size of the preemption time information may be 14 bits. Alternatively, when the data channel of slot #n includes 12 OFDM symbols, the size of the preemption time information may be 12 bits.

One bit of the preemption time information may indicate whether or not the second data has been transmitted in an OFDM symbol mapped to the corresponding bit. For example, a bit set to '0' in the preemption time information may indicate that the second data has not been transmitted in an OFDM symbol mapped to the corresponding bit, and a bit set to '1' in the preemption time information may indicate that the second data has been transmitted in an OFDM symbol mapped to the corresponding bit. In this case, the preemption time information included in the PI for the second data transmitted in the data channel of the slot #n may be set to '00000000110000' or '000000110000'.

Alternatively, a bit set to '0' in the preemption time information may indicate that the second data has been transmitted in an OFDM symbol mapped to the corresponding bit, and a bit set to '1' in the preemption time information may indicate that the second data has not been transmitted in an OFDM symbol mapped to the corresponding bit. In this case, the preemption time information included in the PI for the second data transmitted in the data channel of the slot #n may be set to '11111111001111' or '111111001111'.

Therefore, when the PI is received in the control channel of the slot #n+k, the UE may determine that not only the first data but also the second data have been transmitted in the slot (e.g., slot #n) prior to the slot #n+k, and may not perform the demodulation operation on the first data in the OFDM symbols #8 to #9 indicated by the preemption time information included in the PI. That is, the UE may determine that the first data has not been transmitted in the OFDM symbols #8 to #9 of the slot #n.

In another embodiment, the preemption time information included in the PI may indicate an offset between a reference time point and the transmission position of the second data (e.g., a starting time point or an ending time point of the second data) and the length of the second data. The reference time point may be set to an arbitrary OFDM symbol in the slot. For example, the reference time point may be set to the OFDM symbol #13 which is the last OFDM symbol of the slot #n. In this case, when the second data has been transmitted in the OFDM symbol #13 of the slot #n, the offset indicated by the preemption time information included in the PI may be '0'. Alternatively, when the second data has been transmitted in the OFDM symbol #11 of the slot #n, the offset indicated by the preemption time information included in the PI may be '2'. That is, as the distance between the reference time point and the transmission position of the second data increases, the offset indicated by the preemption time information included in the PI may increase. Therefore, in the embodiment shown in FIG. 13, the offset indicated by the preemption time information included in the PI may be 4 (i.e., the offset between the reference time point and the ending time point of the second data) or 5 (i.e., the offset between the reference time point and the starting time point of the second data), and the length indicated by the preemption time information included in the PI may be the length of 2 OFDM symbols.

Alternatively, the reference time point may be set to the OFDM symbol #0 which is the first OFDM symbol of the slot #n. In this case, when the second data has been transmitted in the OFDM symbol #0 of the slot #n, the offset indicated by the preemption time information included in the PI may be '0'. Alternatively, when the second data has been transmitted in the OFDM symbol #2 of the slot #n, the offset indicated by the preemption time information included in the PI may be '2'. That is, as the distance between the reference time point and the transmission position of the second data decreases, the offset indicated by the preemption time information included in the PI may increase. Therefore, in the embodiment shown in FIG. 13, the offset indicated by the preemption time information included in the PI may be 8 (i.e., the offset between the reference time point and the starting time point of the second data) or 9 (i.e., the offset between the reference time point and the ending time point of the second data), and the length indicated by the preemption time information included in the PI may be the length of 2 OFDM symbols.

On the other hand, the transmission position of the second data in the frequency axis may be indicated as follows. The PI may include information (hereinafter referred to as 'preemption frequency information') indicating the transmission position of the second data in the frequency axis. For example, when the system bandwidth is divided into n subbands, the preemption frequency information included in the PI may indicate one or more subbands through which the second data has been transmitted among the n subbands. Configuration information of the subbands included in the system bandwidth may be transmitted from the base station to the UE through an upper layer message (e.g., RRC message).

In another embodiment, the preemption frequency information included in the PI may indicate one or more bandwidth parts through which the second data has been transmitted among n bandwidth parts. Configuration information of the one or more bandwidth parts may be transmitted from the base station to the UE through an upper layer message (e.g., RRC message). The UE receiving the PI from the base station may determine that the second data has been transmitted in the entire bandwidth parts indicated by the preemption frequency information included in the PI. Therefore, the UE may not perform a demodulation operation on the first data in the bandwidth part indicated by the preemption frequency information included in the PI. That is, the UE may determine that the first data has not been transmitted in the bandwidth part indicated by the preemption frequency information included in the PI.

Meanwhile, the base station may transmit to the UE an RRC message including information indicating whether to perform the PI detection operation, information indicating the execution period of the PI detection operation, and the like. The execution period of the PI detection operation may be set to k slots or m OFDM symbols, and each of k and m may be an integer of 1 or more. In the embodiment shown in FIG. 13, the execution period of the PI detection operation may be set to one slot. The size of the preemption time information included in the PI may be changed according to the execution period of the PI detection operation. For example, when the execution period of the PI detection operation is k slots, the size of the preemption time information included in the PI may be ('number of OFDM symbols included in one slot'×k) bits.

In another embodiment, when a transmission pattern of the second data (e.g., indexes of OFDM symbols used for transmission of the second data) in each of the slots is the same, the base station may transmit the transmission pattern of the second data to the UE. The transmission pattern may be included in the PI, and the UE receiving the PI may determine that the second data has been transmitted in the OFDM symbol(s) indicated by the transmission pattern included in the PI in each of the slots. For example, when the execution period of the PI detection operation is k slots and the transmission pattern indicates the OFDM symbols #8 to #9, the UE may determine that the second data has been transmitted in the OFDM symbols #8 to #9 in k slots.

In another embodiment, when the execution period of the PI detection operation is k slots and the size of the preemption time information included in the PI is a fixed value, one bit in the preemption time information may indicate whether the second data has been transmitted in consecutive m OFDM symbols. When the execution period of the PI detection operation is 2 slots, the size of the preemption time information included in the PI is 14 bits, and one slot includes 14 OFDM symbols, one bit in the preemption time information may indicate whether the second data has been transmitted in consecutive 2 OFDM symbols.

In the embodiment shown in FIG. 13, when the execution period of the PI detection operation is 2 slots, the size of the preemption time information included in the PI is 14 bits, and one slot includes 14 OFDM symbols, the UE may perform the PI detection operation in the slots #n, #n+2 (not shown), #n+4 (not shown), and the like. The PI for the second data transmitted in the data channel of the slot #n may be detected in a control channel of slot #n+2 (not shown). A fifth bit in preemption time information included in the PI detected in the control channel of the slot #n+2 (not shown) may indicate that the second data has been transmitted in the OFDM symbols #8 to #9 of the slot #n.

Summarizing the embodiments described above, transmission and reception of data in the wireless communication network may be performed as follows.

Figure 14:
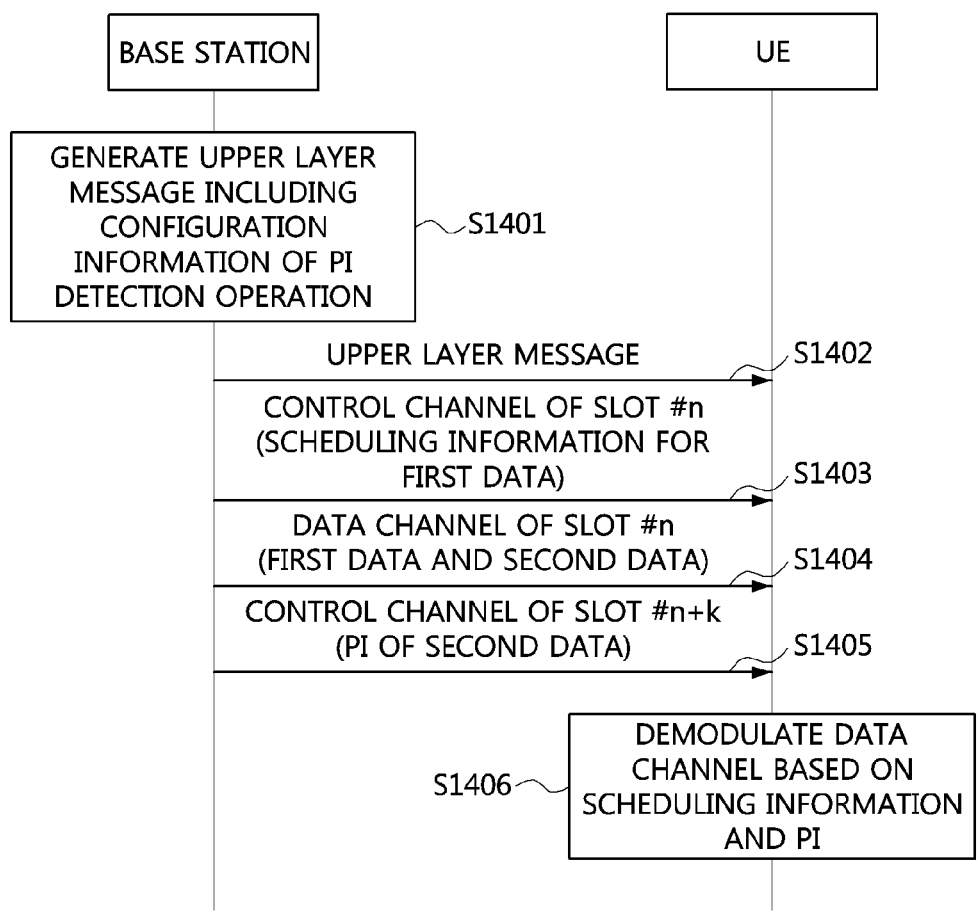
FIG. 14 is a sequence chart illustrating a first embodiment of a method for transmitting and receiving data in a wireless communication network.

FIG. 14 is a sequence chart illustrating a first embodiment of a method for transmitting and receiving data in a wireless communication network.

Referring to FIG. 14, a wireless communication network may include a base station, a UE, and the like. The UE may be located within cell coverage of the base station and may operate in an RRC_connected state. Each of the base station and the UE may be configured to be the same as or similar to the communication node 200 shown in FIG. 2.

The base station may generate an upper layer message (e.g., RRC message) including information indicating whether to perform the PI detection operation, information indicating the execution period of the PI detection operation, or the like (S1401). The base station may transmit the upper layer message to the UE (S1402). The UE may receive the upper layer message from the base station, and may confirm the information indicating whether to perform the PI detection operation, the information indicating the execution period of the PI detection operation, and the like, which are included in the upper layer message. For example, when the upper layer message indicates that the PI detection operation is to be performed and the execution period of the PI detection operation is set to k slots, the UE may perform the PI detection operation in the slots #n+k, #n+2k, #n+3k, and the like. Here, n may be an integer of 0 or more, and k may be an integer of 1 or more.

When the first data to be transmitted in the data channel of the slot #n shown in FIG. 13 is generated, the base station may transmit the control channel including scheduling information for the first data in the slot #n (S1403). Also, when the second data to be transmitted in the data channel of the slot #n is generated and scheduling information for the second data cannot be transmitted through the control channel of the slot #n, the base station may transmit the data channel including the first data and the second data in the slot #n without transmitting the scheduling information for the second data (S1404). Here, the second data may be transmitted in some OFDM symbols (e.g., OFDM symbols #8 to #9) among the OFDM symbols #2 to #13 constituting the data channel of the slot #n. In this case, the first data and the second data may be transmitted based on the rate matching scheme, the puncturing scheme, or the overlapping scheme described above.

The UE may receive the control channel in the slot #n and may obtain the scheduling information for the first data from the control channel. Also, the UE may receive the data channel in the slot #n, and when the PI detection operation is configured to be performed by the upper layer message, the UE may store the corresponding data channel in a buffer without demodulating the data channel.

Meanwhile, when the execution period of the PI detection operation is set to k slots, the base station may transmit a control channel including a PI for the second data transmitted in the data channel of the slot #n through the slot #n+k (S1405). The PI may include preemption time information, preemption frequency information, transmission pattern, or the like. The preemption time information may indicate time resources through which the second data has been transmitted in the slot #n, and may be represented by the bitmap or offset described above. The preemption frequency information may indicate frequency resources (e.g., subband, bandwidth part) through which the second data has been transmitted in the slot #n.

The UE may perform the PI detection operation in the slot #n+k according to the execution period of the PI detection operation. When a PI is not detected in the slot #n+k, the UE may determine that the second data has not been transmitted in the slot #n, and based on the scheduling information obtained from the control channel of the slot #n, the UE may perform a demodulation operation on the data channel. On the other hand, when a PI is detected in the slot #n+k, the UE may determine that the second data has been transmitted in the slot #n, and may identify the resource through which the second data has been transmitted in the slot #n based on the PI. The UE may obtain the first data by performing a demodulation operation on the data channel of the slot #n based on the scheduling information obtained from the control channel of the slot #n and the PI obtained from the control channel of the slot #n+k (S1406).

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

The invention claimed is:

1. An operation method of a base station in a wireless communication network, the operation method comprising:
   transmitting to a user equipment (UE) first downlink control information (DCI) including scheduling information for first data;
   transmitting the first data scheduled by the first DCI and second data in a slot #n; and
   transmitting to the UE second DCI including a preemption indication (PI) indicating a transmission position of the second data within the slot #n in a slot #n+k,
   wherein n is an integer equal to or greater than 0 and k is an integer equal to or greater than 1, the PI is a bitmap, each bit included in the bitmap is mapped to one or more symbols corresponding to the transmission position, and a number of the one or more symbols is determined based on monitoring periodicity of the second DCI.

2. The operation method according to claim 1, further comprising, before the transmitting the first DCI, transmitting an upper layer message including configuration information of a detection operation of the second DCI to the UE.

3. The operation method according to claim 2, wherein the configuration information includes information indicating whether to perform the detection operation of the second DCI and information indicating the monitoring periodicity of the second DCI.

4. The operation method according to claim 1, wherein the first data and the second data are transmitted in the slot #n based on a rate matching scheme or a puncturing scheme.

5. The operation method according to claim 1, wherein a transmission priority of the first data is lower than a transmission priority of the second data.

6. The operation method according to claim 1, wherein the second DCI is a group DCI that UEs located in a cell of the base station are able to receive.

7. An operation method of a user equipment (UE) in a wireless communication network, the operation method comprising:
   receiving from a base station first downlink control information (DCI) including scheduling information for first data;
   performing a reception operation of the first data in a resource region indicated by the first DCI in a slot #n, one or more resources included in the resource region being used for transmitting second data by the base station; and
   receiving from the base station second DCI including a preemption indication (PI) indicating a transmission position of the second data within the slot #n in a slot #n+k,
   wherein n is an integer equal to or greater than 0 and k is an integer equal to or greater than 1, the PI is a bitmap, each bit included in the bitmap is mapped to one or more symbols corresponding to the transmission position, and a number of the one or more symbols is determined based on monitoring periodicity of the second DCI.

8. The operation method according to claim 7, further comprising, before the receiving the first DCI, receiving an upper layer message including configuration information of a detection operation of the second DCI from the base station.

9. The operation method according to claim 8, wherein the configuration information includes information indicating whether to perform the detection operation of the second DCI and information indicating the monitoring periodicity of the second DCI.

10. The operation method according to claim 8, wherein, when the monitoring periodicity of the second DCI is k slots, the second DCI is received in the slot #n+k.

11. The operation method according to claim 7, wherein the first data is obtained in the slot #n based on a rate matching scheme or a puncturing scheme.

12. The operation method according to claim 7, wherein a transmission priority of the first data is lower than a transmission priority of the second data.

13. The operation method according to claim 7, wherein the second DCI is a group DCI that UEs located in a cell of the base station are able to receive.

14. A user equipment (UE) in a wireless communication network, the UE comprising a processor and a memory storing at least one instruction executed by the processor, wherein the at least one instruction is configured to:
   receive from a base station first downlink control information (DCI) including scheduling information for first data;
   perform a reception operation of the first data in a resource region indicated by the first DCI in a slot #n, one or more resources included in the resource region being used for transmitting second data by the base station; and
   receive from the base station second DCI including a preemption indication (PI) indicating a transmission position of the second data within the slot #n in a slot #n+k,
   wherein n is an integer equal to or greater than 0 and k is an integer equal to or greater than 1, the PI is a bitmap, each bit included in the bitmap is mapped to one or more symbols corresponding to the transmission position, and a number of the one or more symbols is determined based on monitoring periodicity of the second DCI.

15. The UE according to claim 14, wherein the at least one instruction is further configured to, before the receiving of the first DCI, receive an upper layer message including configuration information of a detection operation of the second DCI from the base station.

16. The UE according to claim 15, wherein the configuration information includes information indicating whether to perform the detection operation of the second DCI and information indicating the monitoring periodicity of the second DCI.

17. The UE according to claim 14, wherein the first data is obtained in the slot #n based on a rate matching scheme or a puncturing scheme.

* * * * *